A. WARTH.
Sewing Machine.

Patented Sept. 7, 1869.

Witnesses:
C. Wahlers
R. Langmeister

Inventor:
Albin Warth

A. WARTH.
Sewing Machine.

Patented Sept. 7, 1869.

Witnesses:
C. Wahlers
R. Langmeister

Inventor:
Albin Warth

A. WARTH.
Sewing Machine.

Patented Sept. 7, 1869.

Witnesses.
C Wahlers
R Sangmeister

Inventor:
Albin Warth.
Van Santvoord & Ruff
Attys.

UNITED STATES PATENT OFFICE.

ALBIN WARTH, OF STAPLETON, NEW YORK, ASSIGNOR TO HIMSELF AND EBERHARD FABER, OF NEW YORK CITY.

IMPROVEMENT IN SEWING-MACHINES.

Specification forming part of Letters Patent No. 94,677, dated September 7, 1869.

*To all whom it may concern:*

Be it known that I, ALBIN WARTH, of Stapleton, in the county of Richmond, State of New York, have invented a new and useful Improvement in Sewing-Machines; and I do hereby declare the following to be a full, clear, and exact description thereof, which will enable those skilled in the art to make and use the same, reference being had to the accompanying drawing forming part of this specification, in which drawing—

Similar letters indicate corresponding parts.

This invention consists in the arrangement of a raised eye and a raised rim on the back of the shuttle in such a manner that the shuttle-thread on passing out of this eye is held in convenient position to be caught by the cast-off hooks.

Also, in the arrangement of shoulders projecting from the shuttle on a level with the spool, and forming the bearings for the shuttle-driver, and serving to carry the shuttle round in its circular race in such a manner that the equilibrium of the shuttle as the same bears on the shuttle-driver is as much as possible preserved, and all undue friction of the shuttle against its race is avoided.

Further, in the arrangement of one or more segmental rims on the back of the shuttle, projecting into a circular groove in the vertical shuttle-race in such a manner that the shuttle-driver is relieved from the weight of the shuttle, and the loop of the needle-thread can pass freely through between the shuttle and the shuttle-driver, and at the same time the bearing of the shuttle in its race can be brought as close as desirable to the center of motion, and the friction of the shuttle in its race is thereby reduced.

Also, in a sewing mechanism composed of an eye-pointed needle receiving its motion by a smooth eccentric, and of a shuttle which travels in a circular race, when the two are so combined that each stitch is finished before the next stitch is commenced.

Further, in the arrangement of shoulders on the circular rim of the shuttle-race on the sides of the needle-channel, in combination with a shuttle traveling in a circular race, and provided with depressions in its rim in such a manner that the shuttle, in passing through the loop of the needle-thread, will be prevented from producing a rolling motion of said thread, and from carrying the same between the back of the shuttle and the shuttle-race.

Also, in the arrangement of an annular depression in the shuttle-race to take in the points of the noses of the shuttle-race, whereby said noses are enabled to catch hold of the shuttle-thread and impart to it the requisite tension for finishing the stitch before the shuttle arrives in the position opposite the needle.

Further, in the arrangement of cast-off hooks projecting from the shuttle-race, and serving to disengage the shuttle-thread from the noses of the shuttle-driver at the proper moment.

Also, in the arrangement of a radial depression in the shuttle-race in such a manner that the shuttle-thread is free to move sidewise out of the way of the descending needle.

Also, in the arrangement of a double cam on the shuttle-driver, acting on the feed mechanism in such a manner that the requisite feed-motion is produced in whatever direction the shuttle-driver moves.

Further, in the arrangement of self-adjusting cams or eccentrics, in combination with the reciprocating needle, the oscillating lever, rising and falling throat-plate, and shuttle traveling in a circular race, in such a manner that the motion of the needle and the rising and falling motion of the throat-plate adapt themselves automatically to the direction in which the shuttle travels.

Further, in the arrangement of a slotted hub projecting from the cam, which operates the take-up, in combination with a stud or catch secured to the slotted hub of the eccentric, in such a manner that said cam is capable of adjusting itself in either direction to correspond to the position of the eccentric.

Also, in the arrangement of a brake, in combination with the loose self-adjusting cam and spring actuating the take-up, in such a manner that said cam is prevented from being changed in its position by the action of the spring.

Further, in the arrangement of a cam-wheel, in combination with the presser-foot and cloth-plate, in such a manner that a reciprocating motion is imparted to the work and various different stitches can be produced.

Further, in the arrangement of a swivel-plate under the presser-foot, in combination with the guide-rod, in such a manner that said swivel-plate is kept parallel by the guide-rod while the presser-foot oscillates, and thereby the required zigzag motion is imparted to the work without an additional oscillating motion.

Also, in connecting the throat-plate with the presser-foot, which receives an oscillating motion by a cam of suitable shape in such a manner that, by the action of said cam on the presser-foot, the throat-plate, and consequently the work placed on it, receives a reciprocating motion in a direction transversely to the feed-motion, and thereby seams and stitches of various description can be produced.

Further, in the arrangement of a flange projecting downward from the throat-plate, and engaging with the feed-dog in such a manner that said feed-dog is compelled to participate in the reciprocating motion of the throat-plate, and thereby the correct motion of the work is better secured.

Also, in the arrangement of a lip projecting upward from the movable throat-plate, and acting as a central edge-gage for two pieces of leather or other material to be sewed together edge to edge in such a manner that, by said lip and movable throat-plate, a zigzag motion is imparted to the two pieces of material, and the needle is caused to pass first through one and then through the other piece, and a zigzag edge-seam is produced, whereby the two pieces of material are firmly united edge to edge.

Further, in the arrangement of a guiding-screw projecting from or screwed in the presser-foot, in combination with the central edge-gage, in such a manner that said edge-gage is compelled to move with the presser-foot, and that its position can be regulated to conform to the desired course of the seam.

Also, in the arrangement of a hinged spring-lever provided with a set-screw which bears against a stationary lip, and with a projection which acts on the cam-wheel, in combination with the rod which transmits the motion produced by the cam-wheel to the presser-foot in such a manner that the amount of motion to be transmitted from the cam-wheel to the presser-foot can be increased or diminished according to the nature of the stitch to be produced.

Also, in the arrangement of a center point, in combination with a reciprocating throat-plate and cam-wheel, in such a manner that the pattern controlled by the cam-wheel can be sewed in a circle.

Also, in the arrangement of an embroidery attachment actuated by a cam-wheel, which receives its motion from the needle-bar or needle-lever in such a manner that said embroidery attachment can be readily attached to the sewing-machine or removed therefrom, and that it does not interfere with the use of the sewing-machine for ordinary purposes.

Figures 3, 5, 9:
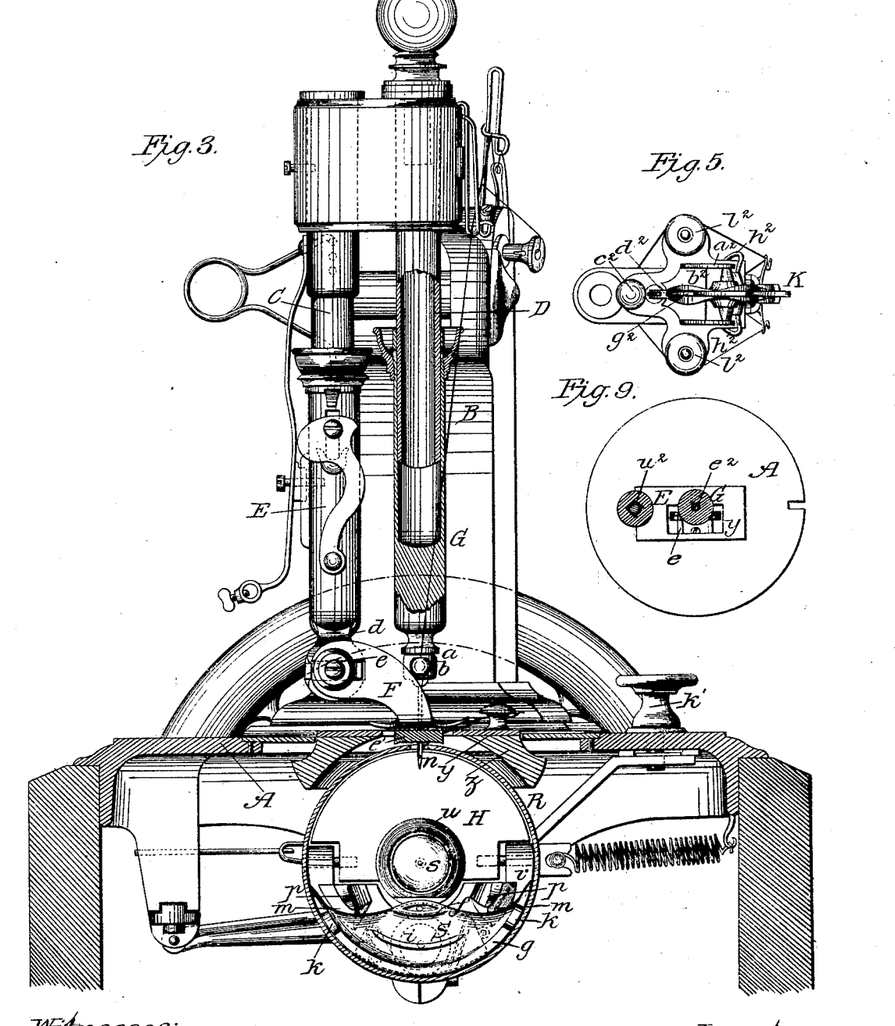
Fig. 3 is a transverse section of the same.
Fig. 5 is a plan or top view thereof.
Fig. 9 is a horizontal section of the same.
Figure 4:
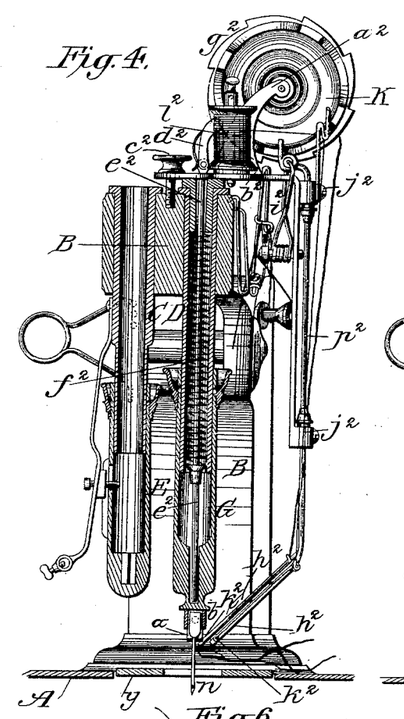
Fig. 4 is a sectional side elevation of the embroidery attachment.
Figure 7:
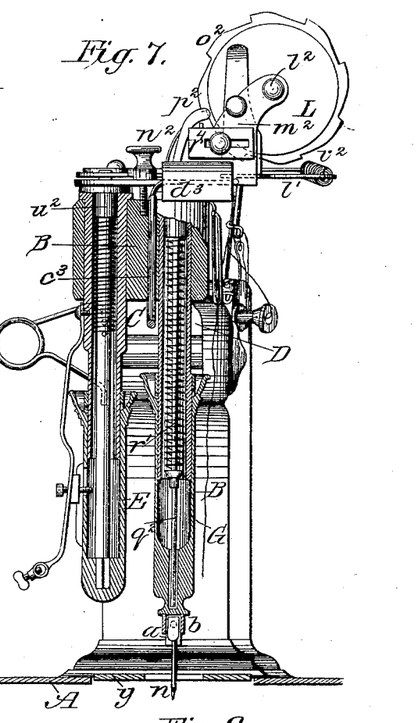
Fig. 7 is a sectional side elevation of the pattern-wheel attachment, by the aid of which various different stitches and ornamented seams are produced.
Figure 10:
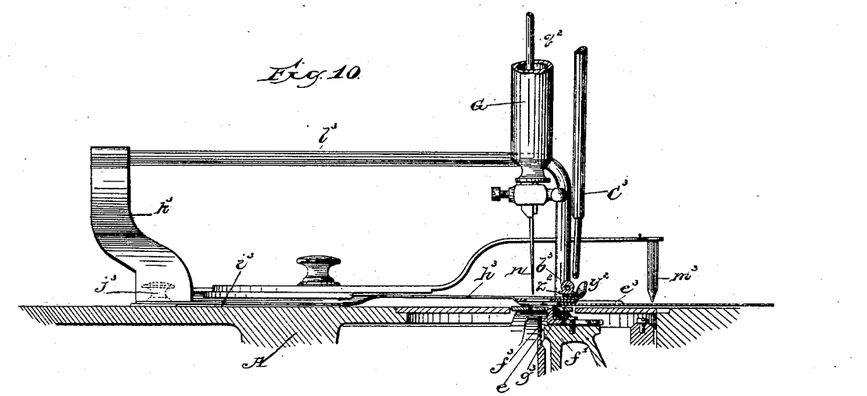
Fig. 10 is a longitudinal section of the parts forming the connection between the pattern-wheel attachment and the throat-plate.
Figure 23:
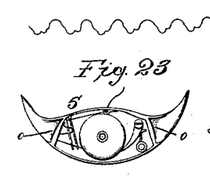
Fig. 23 is a plan of the shuttle.
Figure 24:
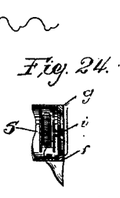
Fig. 24 is a transverse section of the same.

The letter A represents the table or cloth-plate, from one end of which rises the gooseneck B, the end of which is formed into sockets to receive the guide-rods C D, on one of which slides the tubular supporting-bar E of the presser-foot F, while the other forms the guide for the tubular needle-rod G, as shown more particularly in Figs. 4 and 7 of the drawing. The needle-rod G is closed at its bottom end, and it terminates in a flat shank, $a$, which fits loosely into a cage, $b$, which is provided with a clamping-screw, $c$, (see Fig. 1,) so that, by slipping the flat shank of the needle $n$ into the cage $b$ and turning the screw $c$, said needle can be firmly clamped to the end of the needle-bar, and by unscrewing said screw the needle can be removed, and is held firmly in position against lateral as well as against an up-and-down pressure. The supporting-bar E of the presser-foot F is also closed at its bottom end, and it is provided with a curved neck, $d$, (best seen in Fig. 1,) to which the presser-foot is attached by a set-screw or clamping-screw, $e$. By means of this neck the presser-foot is brought in such a position that room is left for the introduction of one or more fingers of the hand under the supporting-bar of the presser-foot, and thereby the manipulation of the work during the process of sewing is materially facilitated. The shuttle S, which is used in this machine, is crescent-shaped, as shown in Figs. 3 and 23. It is provided with an eye, $f$, in the center, between its two points or horns, and this eye projects above the back of the shuttle, (see Fig. 24,) so that the shuttle-thread, in passing from this eye to the throat-plate, does not bear closely against the back of the shuttle, but a space is left to allow the cast-off hooks to catch the thread, as will be presently explained. The shuttle is provided with a raised rim, $g$, on its back, to engage with a groove, $h$, (see Fig. 1,) of the shuttle-race R, so that the weight of the shuttle, while said shuttle passes through the upper half of its race, does not bear down upon the shuttle-driver, and thereby the operation of driving the shuttle is facilitated, and the needle-thread is allowed to pass freely through between the noses of the shuttle-driver and the shuttle. From the back of the shuttle projects also an additional segmental lip, $i$, (see Figs. 1 and 3,) which engages with a groove, $j$, (see Fig. 1,) in the shuttle-race, so that the shuttle, while traveling round in its race, does not bear against the circumferential rim or flange of the race, but is supported by the lip $i$ at a point as close as possible to the center of the race, and thereby the friction created by said shuttle and the power required for propelling the same in its race are reduced.

Figure 21:
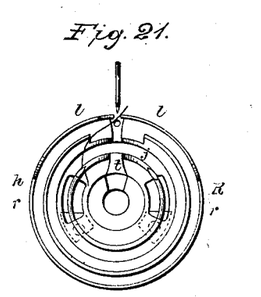
Fig. 21 is a face view of the shuttle-race.

In the rim $g$ are two depressions, $k\ k$, (see Fig. 3,) near the points of the shuttle, and at such points and in such position that the shuttle, while passing through the loop of the needle-thread, will not produce any injurious friction on the shuttle-thread, for just after the point of the shuttle has caught the loop of the needle-thread said loop is carried along in the shuttle-race until it strikes one of the shoulders $l\ l$, (see Fig. 21;) and if the depressions $k\ k$ are not in the shuttle, the needle-thread, while being carried from the needle-path sidewise to said shoulder, would be caused to roll by the friction of the shuttle-race, and by this rolling motion the thread would be untwisted, and its tenacity would be injured; but by making the depressions in the shuttle the needle-thread is relieved from the rolling motion, and, as soon as said thread strikes the shoulder $l$, it is prevented from being carried any farther by the shuttle, and consequently no rolling motion can be imparted to it. The shuttle-driver H is provided with two projections, $m\ m$, (see Fig. 3,) which bear on shoulders $o\ o$ of the shuttle, (see Fig. 23,) and these shoulders are on a level with the middle line of the height of the spool, so that they support the shuttle as near as possible in equilibrium, and that the action of the shuttle-driver will produce no tendency to force the shuttle back against the shuttle-race, whereby an unnecessary friction would be produced. From the shuttle-driver project also two noses, $p\ p$, and the points of these noses project into the circular groove $j$ in the shuttle-race, and they serve to impart to the shuttle-thread the required tension for finishing the stitch before the shuttle has reached the position opposite the needle, and before the needle has again descended far enough to pass into the work, the action of said noses on the shuttle-thread taking place just before the needle-thread is drawn up by the take-up, each stitch being finished before the next stitch is commenced. By this arrangement the use of a smooth eccentric for imparting motion to the needle is rendered feasible; otherwise the motions of the needle and double-pointed shuttle could not be made to harmonize, except by means of cams in the usual manner. After the shuttle-thread has been carried far enough by the noses it is thrown off therefrom by the cast-off hooks $r\ r$, which project from the shuttle-race, (see Figs. 1 and 21,) and it is then caught by the elastic center $s$ being extended between the work and said elastic center, and situated in the depression $t$ in the shuttle-race, which is sufficiently wide to allow the feed-motion to move the shuttle-thread far enough to one side of the needle-path to be out of the way of the descending needle. The radial depression $t$ in the shuttle-race is seen in Fig. 21, and the elastic center in Figs. 1 and 3. This elastic center consists in a center-pin inserted loosely into a socket in the center of the shuttle-driver, and provided with a loose head, which is forced out against the shuttle-race by the action of a spring bearing on the inner end of the center-pin, (see Fig. 1,) so that said head adapts itself readily to the face of the shuttle-race, and remains stationary while the shuttle-driver revolves. Said elastic center serves to retain the shuttle-thread in its lateral position out of the way of the descending needle, and it also prevents the shuttle-thread from forming a loop, which would interfere with the correct operation of the shuttle.

To prevent the shuttle-thread from catching behind the movable head of the elastic center said head is surrounded by a protector, $u$, the edge of which is chamfered off, so that the shuttle-thread, on coming in contact with said protector, glides off and passes in between the head of the elastic center and the shuttle-race.

Figure 22:
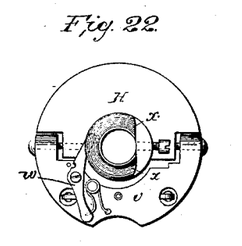
Fig. 22 is a rear view of the shuttle-driver.

The shuttle-driver is provided with a hinged door, $v$, which is locked by a spring-catch, $w$. (Best seen in Fig. 22.) By pressing back this spring-catch this door is released, so that it can be turned back, and the shuttle can be introduced or removed without difficulty.

The shuttle-driver is mounted on the end of the main shaft I, and its hub is tapering, and forms a double-acting cam, $x$, (see Fig. 22,) which serves to actuate the feed-motion in whatever direction the main shaft may be turned.

The work while being sewed is supported by the throat-plate $y$, which rests on the end of a lever, $z$, (see Figs. 1, 2, and 3,) to which an oscillating motion is imparted by the action of a cam, $a^1$, mounted on the main shaft. By these means a rising and falling motion is imparted to the throat-plate, and the work is alternately lifted out of contact with the rough surface of the feed-dog, and then again brought in contact with said rough surface, so that the feed-dog will act on the work only in one direction. The cam $a^1$, which imparts to the lever $z$ the required motion, is mounted loosely on the shaft I, and it is provided with a projection, $b^1$, to receive a stop, $c^1$, which is secured in the shaft, so that the cam is allowed to turn on the shaft until one or the other of the ends of the projection $b^1$ is struck by the stop $c^1$. By this arrangement the cam is rendered self-adjusting, so that the throat-plate is raised and lowered at the proper intervals in whatever direction the main shaft I is turned. The cam $a^1$ acts on a shoe or block, $d^1$, which is attached to the under surface of the lever $z$ opposite the cam $a^1$, and this block is so arranged that it can be readily shifted, so that if it is worn out in one place a fresh surface can be brought opposite the cam and the correct position of the throat-plate is not interfered with.

The feed-dog $e^1$ is attached to a lever or arm, $f^1$, which oscillates on a pin, $g^1$, and to which the required oscillating motion is imparted by the combined action of a spring, $h^1$, (see Fig. 2,) and of a tappet-arm, $i^1$. (See Fig. 2.) This tappet-arm is mounted on the end of a rod, $j^1$, that has its bearings in lugs or brackets projecting from the under surface of the cloth-plate A, being so arranged that it is parallel to the main shaft, and that it can be moved in its bearings in the direction parallel to the main shaft by means of a button, $k^1$, which projects above the cloth-plate, and serves to regulate the length of the stitches, as will be presently explained.

One end of the tappet-arm $i^1$ straddles a pin projecting from the lever $f^1$, which supports the feed-dog, and its other end bears against the cam $x$ formed by the hub of the shuttle-driver, and as the shuttle-driver revolves said cam imparts an oscillating motion to the tappet-arm $i^1$, and through it to the lever $f^1$, which carries the feed-dog. The amount of motion imparted to the feed-dog depends upon the position of the tappet-arm $i^1$ in relation to the cam $x^1$. If said tappet-arm stands opposite the thick part of the cam the feed-motion is large and the stitches produced are long, but if the tappet-arm is moved toward the thin end of the cam the feed-motion is decreased and the length of the stitches diminished. The pin $g^1$, which forms the bearing for the feed-dog lever $f^1$, also supports the shuttle-race, and it is situated in line with the main shaft I, so that the holes, which form the bearings for said shaft and for the pin, can be bored out at one operation and without changing the position of the cloth-plate in relation to the drill, and thereby the construction of the machine and the adjustment of the various parts in relation to each other are materially facilitated. The motion of the needle-bar is produced by the action of a plain eccentric, $l^1$, which is mounted on the main shaft I, and connects by a rod, $m^1$, and lever, $n^1$, with the needle-bar. The use of this plain eccentric for operating the needle-bar in place of the cam generally used has obvious advantages, since such eccentric is easier made, and driven with less power. The eccentric $l^1$ is placed loosely on the shaft I, and it is provided with a long hub, $o^1$, furnished with a segmental slot, $p^1$, to receive the stop $q^1$, which is firmly secured to the shaft I. By this arrangement said eccentric is allowed to turn on its shaft as far as the slot $p^1$ and stop $q^1$ will permit, and it is enabled to adjust itself automatically on the shaft according to the direction in which said shaft is turned. On the hub of the eccentric $l^1$ is mounted the cam $r^1$, which controls the motion of the take-up $s^1$. This cam is also provided with a slotted hub, $u^1$, and a stop, $t^1$, secured to the hub of the eccentric $l^1$, engages with the slot in the hub $u^1$, and allows said cam to adjust itself automatically, according to the direction in which the main shaft is turned. The cam $r^1$ acts within the opening formed by arm $v^1$, (see Fig. 1,) which is held in contact with said cam by a spring, $w^1$, and which connects with the take-up $s^1$ by means of a rod, $x^1$. To prevent said cam from being turned spontaneously by the action of the spring $w^1$, a brake, $y^1$, is applied, which produces sufficient friction to retain said cam against the action of its spring, but allows it to adjust itself freely according to the direction in which the main shaft revolves.

The take up consists of an elbow-lever, and the rod $x^1$ passes loosely through its horizontal arm, said rod being provided with a head or stop, so that it acts on the take-up in going down, but does not impart to the same any motion in going up. A finger, $z^1$, which is attached to the rod connecting the eccentric $l^1$ with the needle-lever, serves to restore the take-up to the position which the same occupies in Fig. 1, and by these means a positive motion is imparted to said take-up in either direction, and its operation is not made dependent on the action of springs, which subject the thread to an unnecessary tension. The finger $z^1$ is adjustable on the eccentric rod, so that it can be made to act on the take-up at the proper moment.

Figure 1:
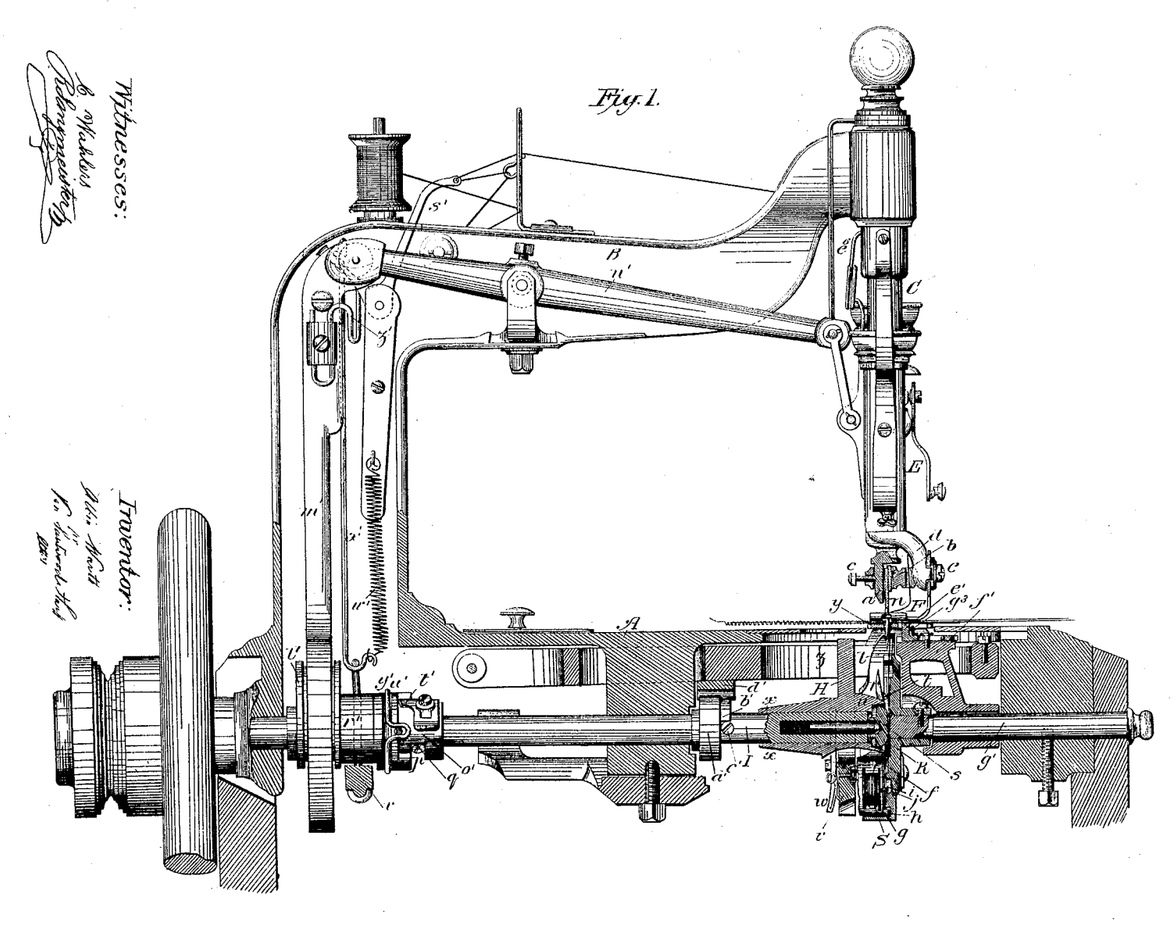
Figure 1 represents a longitudinal vertical section of this invention.
Figure 2:
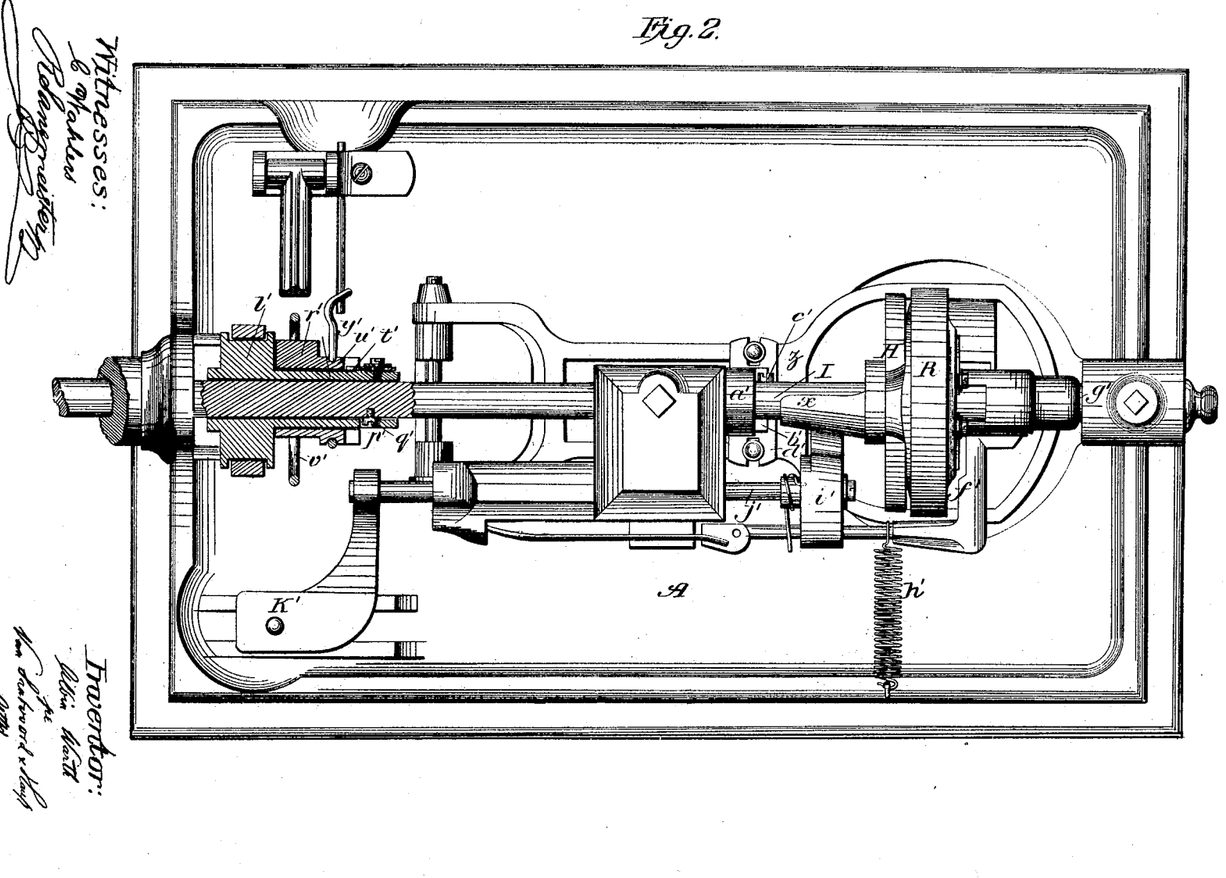
Fig. 2 is an inverted plan of the same.

I will now proceed to describe the various attachments for producing seams and stitches of different kinds. For this purpose I use cam-wheels of various forms, such, for instance, as shown in Figs. 4, 7, 18, 19, and 20. The cam-wheel K, Fig. 4, serves to produce the embroidery-stitch. It is mounted on a shaft, $a^2$, which has its bearings in a bracket, $b^2$, that is secured to the end of the goose-neck B by a screw, $c^2$. An intermittent revolving motion is imparted to said cam-wheel by means of a pawl, $d^2$, which is mounted on the upper end of a rod, $e^2$, that extends down into a hollow needle-rod, G, as shown in Fig. 4, being subjected to the action of a spring, $f^2$, which keeps its bottom end in contact with the bottom of the hollow needle-rod. Said pawl acts on ratchet-teeth $g^2$, cut into the circumference of the cam-wheel, and it is hinged to the rod $e^2$, so that it can be conveniently thrown in or out of gear with said ratchet-teeth. As the needle-bar rises and falls the pawl acts on the ratchet-teeth, and imparts to the cam-wheel an intermittent rotary motion. Instead of operating the rod $e^2$ from the needle-bar, it may be operated from the needle-lever, as indicated in Fig. 1, by means of a rod, $e^6$.

Figures 6, 8, 18, 19, 20:
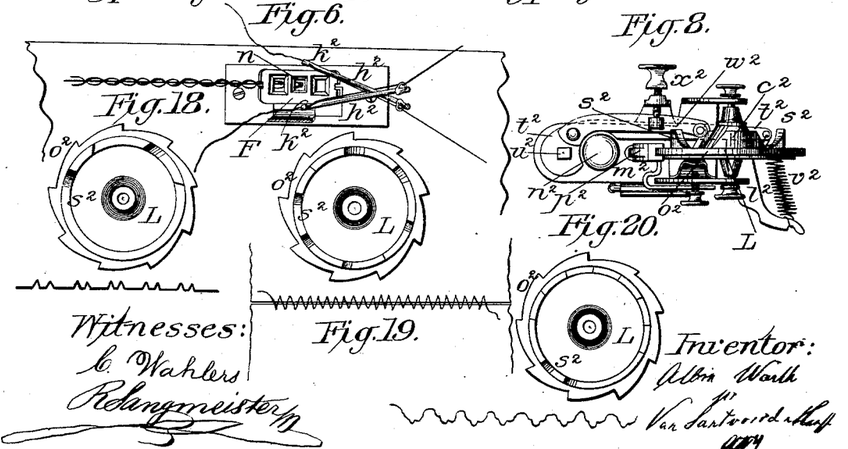
Fig. 6 is a horizontal section of the same.
Fig. 8 is a top view thereof.
Figs. 18, 19, and 20 are front views of the cams and diagrams of the stitches produced thereby.

On the sides of the cam-wheel are two rods, $h^2$, the upper ends of which are bent, as shown in Figs. 4 and 5, and held in contact with the sides of the cam-wheel by springs $i^2$. These rods have their bearings in lugs $j^2$, secured to the bracket $b^2$, and their lower ends are bent in oblique directions toward the needle, and they are provided with eyes $k^2$, (see Fig. 4,) to receive the embroidering-threads, which are taken from spools $l^2$, mounted on pins, which rise from the bracket $b^2$. On the sides of the cam-wheel K are four, more or less, projections or cams, which act on the rods $h^2$, and impart to the same an oscillating motion, whereby their lower oblique ends are caused to assume a vibrating motion, and the threads passing through the eye $k^2$ are braided together in front of the needle $n$. By these means an embroidery-stitch is produced, as shown in Fig. 6, which is sewed down upon the work by the action of the ordinary sewing mechanism.

If the embroidery attachment is not required the screw $c^2$ is unscrewed, and the whole attachment can be taken off, leaving the sewing mechanism undisturbed.

In Figs. 7 to 15, inclusive, I have shown my cam-wheel attachment for producing various fancy stitches, and also what I term a zigzag edge-seam, an overhand-stitch, and a semi-overhand stitch. This attachment consists of a cam-wheel, L, which is mounted on a pin, $l^2$, that has its bearings in a bracket, $m^2$, which is secured to the end of the gooseneck B by a screw, $n^2$. The cam-wheel is provided with ratchet-teeth $o^2$ on its circumference, and a pawl, $p^2$, engages with these ratchet-teeth, and imparts to the cam-wheel the desired intermittent rotary motion. The pawl $p^2$ is hinged to the upper end of a rod, $q^2$, which extends down through the hollow guide-rod D and tubular needle-rod G, and bears on the bottom of said needle-rod, being depressed by the action of a spring, $r^2$. The amount of motion imparted by the pawl $p^2$ to the cam-wheel can be regulated by a slide, $r^4$, secured to the bracket $m^2$, and so arranged that it allows the pawl to engage with the ratchet-teeth either throughout the entire stroke of the needle-bar, or throughout a portion of said stroke only, according to the position which may be given to said slide. The rod $q^2$ may also be operated by the needle-lever, instead of by the needle-slide, by causing said rod to bear on the end of the needle-lever, similar to rod $e^6$ shown in Fig. 1. The pawl may, however, be turned back and thrown entirely out of gear with the cam-wheel, if it is desired to stop the motion of said cam-wheel. The cam-wheel is provided on one side with projections or cams $s^2$ of various forms, such, for instance, as shown in Figs. 18, 19, and 20, and these cams act on a lever, $t^2$, which is secured to the end of a rod, $u^2$, that extends down through the guide-rod C and into the tubular bar E, to which the presser-foot is attached, the bottom end of the rod $u^2$ being made square to fit into a square socket in the presser-foot bar, so that an oscillating motion imparted to said rod will be transmitted to the presser-foot. The lever $t^2$ is drawn up toward the cams $s^2$ by a spring, $v^2$, and it is provided with a hinged tappet-arm, $w^2$, the end of which bears against the cams. This tappet-arm is adjusted by a set-screw, $x^2$, so that the amount of motion imparted to the rod $u^3$ by the cams $s^2$ can be increased and diminished at pleasure.

The presser-foot which I use in this case is made in two parts, (see Figs. 10 to 15,) viz., the part $y^2$, which is attached to the bar E, and the part $z^2$, which is hinged to the part $y^2$ by a pivot, $a^3$. (Best seen in Fig. 12.) The part $z^2$ is provided with a horizontal tubular socket, $b^3$, to receive the end of a rod, $c^3$, the upper end of which is bent and flattened and made to catch in a guide, $d^3$, (see Fig. 7,) attached to the bracket $m^2$. By this arrangement the part $z^2$ of the presser-foot which bears directly on the work is held in a horizontal position, and receives a reciprocating motion, while the part $y^2$ of said presser-foot oscillates with the presser-foot bar E.

The work to be sewed is placed under the presser-plate $z^2$ and on the additional throat-plate that is provided with a downwardly-projecting lip, $f^3$, which catches into a recess, $g^3$, on the feed-dog $e^1$. (Best seen in Figs. 1 and 10.) From the additional throat-plate $e^3$ extends a rod, $h^3$, back to a guide-plate, $i^3$, which is held loosely down upon the main cloth-plate A by a set-screw, $j^3$, and from this guide-plate rises a standard, $k^3$, that connects by a tubular rod, $l^3$, with the pivot $a^3$ of the presser-plate $z^2$. By this arrangement the reciprocating motion of the presser-plate is transmitted to the additional cloth-plate and to the work held between said presser-plate and cloth-plate, and if the set-screw which holds the feed-dog $e^1$ down upon the lever $f^1$, Fig. 1, is loosened, said feed-dog participates in the reciprocating motion of the additional cloth-plate. By the combination of the feed-motion and of the cam-motion, therefore, a zigzag motion is imparted to the work under the needle $n$, and seams or stitches can be produced of various form—such, for instance, as shown in Figs. 18, 19, and 20—and it is obvious that by changing the forms of the cams the stitches can be varied to any desired extent. By attaching a center-point, $m^3$, (see Fig. 10,) to the rod $h^3$, which connects the additional cloth-plate with the guide-plate $i^3$, the fancy stitches can be sewed in a circle, and in this case I use a feed-dog with a single tooth or point, so that the work can turn round without wrinkling.

Figures 11, 13, 15:
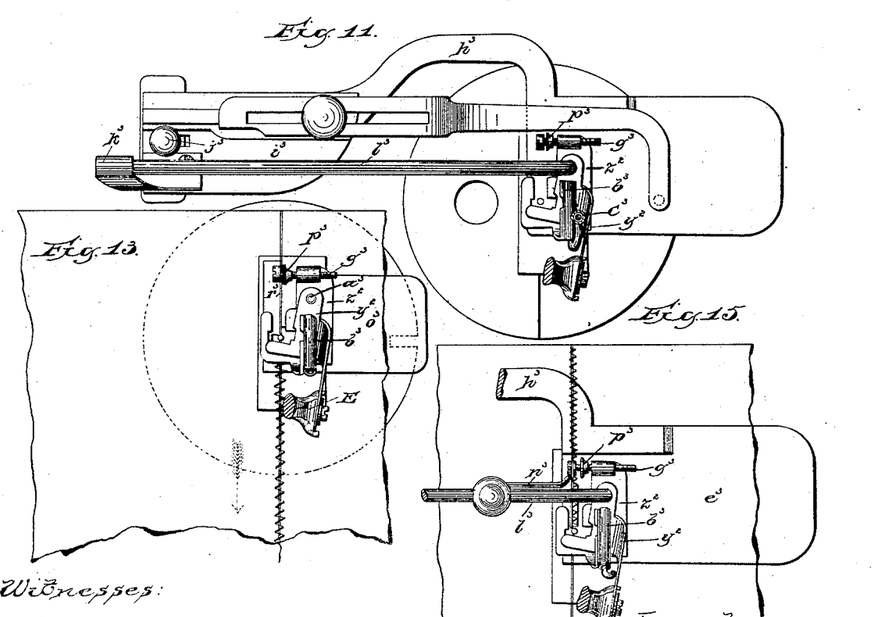
Fig. 11 is a plan or top view of the same.
Fig. 13 is a plan or top view of the central edge-gage used in joining two pieces of material at their ends or edges.
Fig. 15 is a similar view of the attachment for making the zigzag overhand-stitch.
Figure 12:
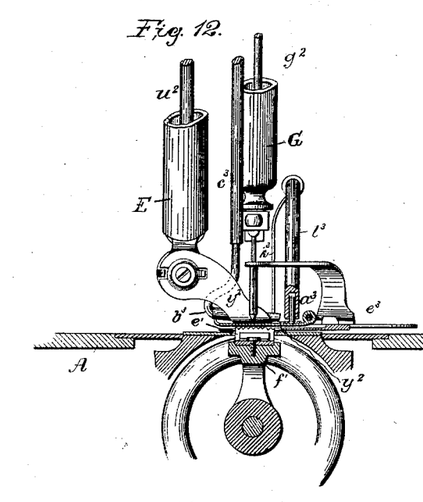
Fig. 12 is a transverse section of the same.
Figure 14:
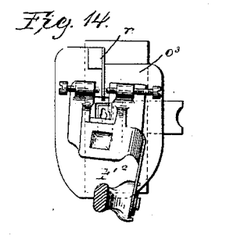
Fig. 14 is a modification thereof.

For the purpose of making what I term the semi-overhand stitch; or, in other words, for sewing one piece of material on another by a zigzag stitch, passing alternately down through both pieces of material, and then only through the lower piece, I attach to the rod $l^3$ an adjustable edge-gage, $n^3$, which forms a guide for the upper piece of material, as shown in Fig. 15. For the purpose of making what I term a zigzag edge-seam, which serves to sew two pieces of material together, edge to edge, as shown in Fig. 13, I substitute for the additional throat-plate $e^3$ another throat-plate, $o^3$, (see Fig. 13,) which is also provided with a downwardly-projecting lip to engage with the feed-dog, but which is connected to the presser-plate $z^2$ by means of a set-screw, $q^3$, provided with a jam-nut, $p^3$, and so arranged that it can be introduced in a slot in the lip $r^3$, which rises from the upper surface of the throat-plate $o^3$. This lip also serves as the gage for guiding the two pieces of material to be united, one piece being made to bear against one, and the other piece against the other side of said gage, and by means of the set-screw $p^3$ this gage can be so adjusted that the joint of the two pieces to be united is just under the point of the needle. The throat-plate $o^3$, instead of being guided by the guide-plate $i^3$, is simply guided by a pin projecting downward into a slot in the main cloth-plate, as shown in dotted lines in Fig. 13. By changing the form of the cams this zigzag edge-stitch can be so modified that the needle passes down first through one of the pieces to be joined, then through the joint, and then through the other piece. This double edge-gage $r^3$ and the throat-plate $o^3$, may also be attached to the presser-foot $F^2$ in the manner shown in Fig. 14, the presser-foot itself being provided with two set-screws, which serve to set the edge-gage. This throat-plate $o^3$ may also be used for sewing an ordinary overhand-seam.

Figure 16:
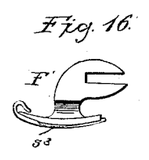
Fig. 16 is a front view, and Fig. 17 a transverse section, of the spring presser-foot.
Figure 17:
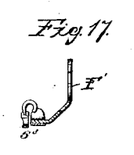

In some cases I find it of advantage to use a spring presser-foot, $F^1$, such as shown in Figs. 16 and 17. This foot is provided with a spring, $s^3$, which exerts a slight pressure on the work when the throat-plate descends or the presser-foot rises, so that the work cannot be displaced by accident.

Having thus described my invention, what I claim as new, and desire to secure by Letters Patent, is—

1. The raised eye $f$ on the shuttle S, in combination with the raised rim $g$, so as to bring the shuttle-thread in the proper position for the cast-off hooks $r\ r$, substantially as shown and described.

2. The shoulders $o$ on the shuttle, being situated on a level with the middle line of the height of the spool, secured in the shuttle substantially as described.

3. The projecting rims $g$ and $i$ on the back of the shuttle, in combination with a circular groove in the vertical shuttle-race, and with the noses of the shuttle-driver serving to support the weight of the shuttle, so as to allow the needle-thread to pass freely through between the shuttle and the noses of the shuttle-driver, substantially as set forth.

4. A sewing mechanism composed of an eye-pointed needle, receiving its motion from a smooth eccentric and a shuttle traveling in a circular race, when constructed substantially as described, to operate together in the manner set forth.

5. The shoulders $l\ l$ on the circular rim in the shuttle-race R, in combination with a shuttle traveling in a circular race, and provided with depressions $k$ in its rim, substantially as set forth.

6. The annular depression $j$ in the shuttle-race R, in combination with hooks $p\ p$ of the shuttle-driver, as described.

7. The cast-off hooks $r\ r$ in the shuttle-race, in combination with the noses $p\ p$ of the shuttle-driver, substantially as set forth.

8. The radial depression $t$ in the circular shuttle-race R, substantially as described.

9. The double cam $x\ x$ on the shuttle-driver, in combination with the feed mechanism, substantially as set forth.

10. The self-adjusting cams $o^1$ and $a^1$, in combination with the reciprocating needle $n$, the lever $z$, rising and falling throat-plate $y$, and with the double-pointed shuttle moving in a circular race in either direction, substantially as set forth.

11. The slotted hub of the cam $u^1$ which actuates the take-up, in combination with the stop $t^1$, on the slotted hub $o^1$ of the eccentric $l^1$, and with the stop $q$, substantially as described.

12. The brake $y^1$, in combination with the slotted hub of the cam $u^1$, and with the spring $w^1$, substantially as set forth.

13. The combination of a cam-wheel, L, with the presser-foot and cloth-plates $e^1$, substantially as set forth.

14. The swivel-plate $z^2$ under the presser-foot $y^2$, in combination with the guide-rod $c^3$, substantially as set forth.

15. The combination of the additional throat-plate $e^3$ with the presser-foot and cam-wheel L, substantially as described.

16. The flange $f^3$ on the throat-plate $e^3$, in combination with the feed-dog $e^1$, substantially as set forth.

17. The double edge-gage $r^3$ on the throat-plate $o^3$, in combination with the oscillating presser-foot $y^2\ z^2$, substantially as described.

18. The guiding-screw $q^3$, secured in the presser-foot, in combination with the lip $r^3$ of the throat-plate $o^3$, substantially as set forth.

19. The arrangement of the hinged spring-lever $t^2$, provided with a set-screw, and with a projection which acts on the cam-wheel L, in combination with the rod $u^2$ and presser-foot E, substantially as described.

20. The center-point $m^3$, in combination with the additional throat-plate $e^3$ and oscillating presser-foot $y^2\ z^2$, substantially as set forth.

21. The embroidery attachment, consisting of a cam-wheel, K, operated by a pawl from the needle-bar or needle-lever, and actuating the rods $h^2$, having oblique thread-guides $k^2$, all constructed substantially as set forth.

22. The adjustable edge-gage $n^3$, in combination with the additional plate $e^3$ and movable presser-foot $y^2\ z^2$, substantially as described.

Witnesses:     ALBIN WARTH.
W. HAUFF,
ERNEST F. KASTENHUBER.